US010023341B1

(12) United States Patent
Christopher

(10) Patent No.: US 10,023,341 B1
(45) Date of Patent: Jul. 17, 2018

(54) SYSTEMS AND METHODS FOR SPILL DETECTION

(71) Applicant: Express Scripts Strategic Development, Inc., St. Louis, MO (US)

(72) Inventor: Jerry W. Christopher, Collinsville, IL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 281 days.

(21) Appl. No.: 14/725,418

(22) Filed: May 29, 2015

(51) Int. Cl.
| H04N 7/18 | (2006.01) |
| B65B 57/10 | (2006.01) |
| B65B 1/04 | (2006.01) |
| G06T 7/00 | (2017.01) |

(52) U.S. Cl.
CPC ............... *B65B 57/10* (2013.01); *B65B 1/04* (2013.01); *G06T 7/0016* (2013.01); *H04N 7/183* (2013.01); *G06T 2207/10016* (2013.01); *G06T 2207/30232* (2013.01); *G06T 2207/30242* (2013.01)

(58) Field of Classification Search
CPC ......... B65B 57/10; B65B 1/04; G06T 7/0016; G06T 2207/10016; G06T 2207/30232; G06T 2207/30242; H04N 7/183
See application file for complete search history.

(56) References Cited

U.S. PATENT DOCUMENTS

| 5,771,657 | A | 6/1998 | Lasher et al. |
| 6,769,228 | B1 | 8/2004 | Mahar |
| 6,892,512 | B2 | 5/2005 | Rice et al. |
| 7,313,898 | B1 | 1/2008 | Eller et al. |
| 7,765,776 | B1 | 8/2010 | Leu et al. |
| 7,995,831 | B2 | 8/2011 | Eller et al. |
| 8,731,711 | B1 | 5/2014 | Joplin et al. |
| 8,756,998 | B1 | 6/2014 | Joplin |
| 2006/0088196 | A1* | 4/2006 | Popovich, Jr. .......... G06T 7/001 382/128 |
| 2007/0127819 | A1* | 6/2007 | Lee ..................... G06F 17/3079 382/190 |
| 2009/0034086 | A1* | 2/2009 | Montgomery ......... G03B 35/10 359/629 |

(Continued)

OTHER PUBLICATIONS

Cognex, www.cognex.com/products/machine-vision/in-sight-7000-series-integrated-vision-systems/, at least as early as Jan. 28, 2014.

(Continued)

*Primary Examiner* — Anner Holder
*Assistant Examiner* — Jill Sechser
(74) *Attorney, Agent, or Firm* — Hush Blackwell LLP

(57) ABSTRACT

A pharmaceutical filling system for a high volume pharmacy is described. The system can include a spill detection subsystem and method. The system can include a cameras to take images that a processed to determine presence of a spilled pharmaceutical. A mirror portion is provided so that the camera can take images of the entire field of the filling area. The mirror portion can be a concave mirror that increases the field of view of the camera. A light panel can illuminate the field of view to allow the camera to take high speed images. A controller can receive a series of at least two images captured by the camera and determine whether an object in the captured images is a spilled pharmaceutical.

20 Claims, 13 Drawing Sheets

(56) References Cited

U.S. PATENT DOCUMENTS

| | | | | |
|---|---|---|---|---|
| 2010/0141772 A1* | 6/2010 | Inaguma | ............... | G01S 3/7864 348/169 |
| 2011/0221767 A1* | 9/2011 | Kostrzewski | ............ | G02B 5/09 345/629 |
| 2012/0330684 A1* | 12/2012 | Jacobs | ..................... | H04N 7/18 705/3 |
| 2013/0142406 A1* | 6/2013 | Lang | .................... | G06K 9/6293 382/128 |
| 2013/0182114 A1* | 7/2013 | Zhang | ....................... | H04N 7/18 348/150 |
| 2014/0152876 A1* | 6/2014 | Adachi | ................... | G06T 7/254 348/239 |

OTHER PUBLICATIONS

Cognex, www.cognex.com/products/machine-vision/in-sight-explorer-software/, at least as early as Jan. 28, 2014.
Cognex, www.cognex.com/optical-inspection-systems-EasyBuilder.aspx, at least as early as Jan. 28, 2014.

\* cited by examiner

SYSTEMS AND METHODS FOR SPILL DETECTION

FIELD

The field relates to automated filling centers, and more particularly to a high volume fulfillment center, e.g., a high volume pharmacy and to systems and methods used in filling prescriptions and prescription orders at a high volume pharmacy.

BACKGROUND

A high-volume pharmacy may process and fill a large number of prescriptions and prescription orders. Automated systems may be used by a high volume pharmacy to process and fulfill prescriptions.

Frequently, more than one prescription drug is required to complete a prescription order. Portions of the prescription order may be fulfilled in different areas of the high-volume pharmacy. After fulfillment, the fulfilled prescriptions may be gathered into a complete prescription order for shipping.

DETAILED DESCRIPTION

Example systems and methods for spill detection are described. In the following description, for purposes of explanation, numerous specific details are set forth in order to provide a thorough understanding of example embodiments. It will be evident, however, to one of ordinary skill in the art that these embodiments may be practiced without these specific details.

Generally, a prescription order is generated for a high volume pharmacy. The prescription order may include more than one prescription drug for fulfillment. Each prescription drug in a prescription order is an order component of the prescription order. Generally, the order components are pill bottles or other packaging having a quantity of a prescription drug therein.

The prescription drugs may be dispensed at various sections of the high volume pharmacy. Some prescription orders may require manual fulfillment of order components. Distribution of order components necessitating manual fulfillment is provided by a distribution section and one or more manual sections. In general, manual handling includes manual fulfillment of prescription drugs. Manual handling occurs at one or more than one manual sections, from which the order component exits the manual fulfillment device.

Figure 1:
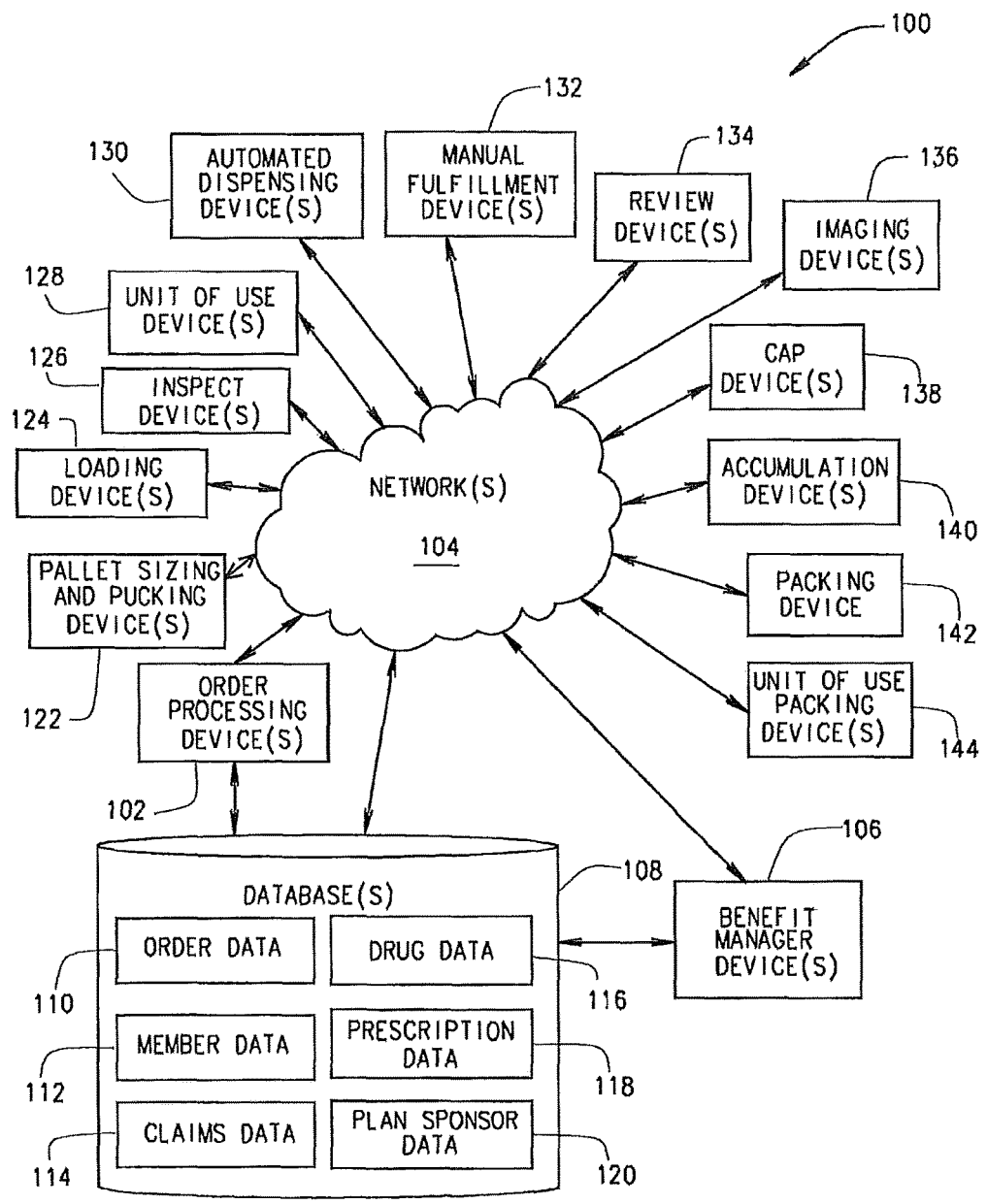
FIG. 1 is a block diagram of an example system, according to an example embodiment.

FIG. 1 is a block diagram of an example system 100, according to an example embodiment. While the system 100 is generally described as being deployed in a high volume fulfillment center (e.g., a mail order pharmacy, a direct delivery pharmacy, and the like), the system 100 and/or components thereof may otherwise be deployed. The system 100 may include an order processing device 102 in communication with a benefit manager device 106 over a network 104. Additional devices which may be in communication with the benefit manager device 106 and/or the order processing device 102 over network 104 include: database(s) 108 which may store one or more than one of order data 110, member data 112, claims data 114, drug data 116, prescription data 118, and plan sponsor data 120; pallet sizing and pucking device(s) 122; loading device(s) 124; inspect device(s) 126; unit of use device(s) 128; automated dispensing device(s) 130; manual fulfillment device(s) 132; review device(s) 134; imaging device(s) 136; cap device(s) 138; accumulation device(s) 140; packing device(s) 142; and unit of use packing device(s) 144. The system 100 may also include additional devices.

The order processing device 102 may receive information about prescriptions being filled at a pharmacy in which the order processing device 102 is deployed. In general, the order processing device 102 is a device located within or otherwise associated with a pharmacy location to enable fulfillment of a prescription by dispensing prescription drugs. In some embodiments, the order processing device 102 may be a device separate from a pharmacy that enables communication with other devices located within a pharmacy. For example, the order processing device 102 may be in communication with another order processing device 102 and/or other devices 122-144 located with a pharmacy. In some embodiments, an external pharmacy order processing device 102 may have limited functionality (e.g., as operated by a patient requesting fulfillment of a prescription drug) when an internal pharmacy order processing device 102 may have greater functionality (e.g., as operated by a pharmacy).

The order processing device 102 may track a prescription order as it is fulfilled. A prescription order may include one or more than one prescription to be filled by the pharmacy. The order processing device 102 may make pharmacy routing decisions and/or order consolidation decisions for a prescription order. The pharmacy routing decisions include what device or devices in the pharmacy are responsible for filling at least a portion of the prescription order, where the order consolidation decisions include whether portions of a prescription order or multiple prescription orders should be shipped together for a patient or a patient family. The order processing device 102 may operate in combination with the benefit manager device 106.

Examples of the order processing device 102 include a set-top box (STB), a receiver card, a mobile telephone, a personal digital assistant (PDA), a display device, a portable gaming unit, a tablet, and a computing system; however other devices may also be used. For example, the order processing device 102 may include a mobile electronic device, such an IPHONE or IPAD device by Apple, Inc., mobile electronic devices powered by ANDROID by Google, Inc., and a BLACKBERRY device by Blackberry Limited. The order processing device 102 may also include other computing devices, such as desktop computing devices, notebook computing devices, netbook computing devices, gaming devices, and the like. The device 102 may include a processor, a memory to store data and instructions, and communication functionality. Other types of electronic devices that can use rules and instructions to execute various functions may also be used.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may include optical communications. The network 104 may be a local area network or a global communication network, such as the Internet. Other conventional and/or later developed wired and wireless networks may also be used. In some embodiments, the network 104 may include a prescribing network such as the electronic prescribing network operated by Surescripts of Arlington, Va.

The benefit manager device 106 is a device operated by an entity at least partially responsible for creation and/or management of the pharmacy or drug benefit. While the benefit manager operating the benefit manager device 106 is typically a pharmacy benefit manager (PBM), other entities may operate the benefit manager device 106 either on behalf of themselves, the PBM, or another entity. For example, the benefit manager may be operated by a health plan, a retail pharmacy chain, a drug wholesaler, a data analytics or other type of software-related company, or the like. In some embodiments, a PBM that provides the pharmacy benefit may also provide one or more than one additional benefits including a health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy.

Some of the operations of the PBM that operates the benefit manager device 106 may include the following. A member (or a person on behalf of the member) of a pharmacy benefit plan administered by or through the PBM attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of mechanical, electrical, an electronic communication device and/or computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of a plan sponsor or client with the PBM. The member's co-pay may be based on a flat co-pay (e.g., $10), co-insurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug. The co-pay may also vary based on the channel used to receive the prescription drug. For example, the co-pay for receiving prescription drug from a mail order pharmacy location may be less than the co-pay for receiving prescription drug from a retail pharmacy location.

In conjunction with receiving the co-pay (if any) from the member and dispensing the prescription drug to the member, the pharmacy submits a claim to the PBM for the prescription drug. The PBM may perform certain adjudication operations including verifying the eligibility of the member, reviewing the formulary of the member to determine appropriate co-pay, coinsurance, and deductible for the prescription drug, and performing a drug utilization review (DUR) on the member. The PBM then provides a response to the pharmacy following performance of at least some of the aforementioned operations. As part of the adjudication, the plan sponsor (or the PBM on behalf of the plan sponsor) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, at least some of the functionality of the order processing device 102 may be included in the benefit manager device 106. The order processing device 102 may be in a client-server relationship with the benefit manager device 106, a peer-to-peer relationship with the benefit manager device 106, or in a different type of relationship with the benefit manager device 106.

The order processing device 102 and/or the benefit manager device 106 may be in communication directly (e.g., through local storage) and/or through the network 104 (e.g., in a cloud configuration or software as a service) with a database 108 (e.g., as may be retained in memory or otherwise). The database 108 may store order data 110, member data 112, claims data 114, drug data 116, prescription data 118, and/or plan sponsor data 120. Other data may be stored in the database 108.

The order data 110 may include data related to the order of prescriptions including the type (e.g., drug name and strength) and quantity of each prescription in a prescription order. The order data 110 may also include data used for completion of the prescription, such as prescription materials. In general, prescription materials are a type of order materials that include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, or the like. The order data 110 may be used by a high volume fulfillment center to fulfill a pharmacy order.

In some embodiments, the order data 110 includes verification information associated with fulfillment of the prescription in the pharmacy. For example, the order data 110 may include videos and/or images taken of (i) the prescription drug prior to dispensing, during dispensing, and/or after dispensing, (ii) the prescription container (e.g., a prescription bottle and sealing lid) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other type of verification information such as bar code data read from pallets used to transport prescriptions within the pharmacy may also be stored as order data 110.

The member data 112 includes information regarding the members associated with the benefit manager. Examples of the member data 112 include name, address, telephone number, e-mail address, prescription drug history, and the like. The member data 112 may include a plan sponsor identifier that identifies the plan sponsor associated with the member and/or a member identifier that identifies the member to the plan sponsor. The member data 112 may include a member identifier that identifies the plan sponsor associated with the patient and/or a patient identifier that identifies the patient to the plan sponsor. The member data 112 may also include, by way of example, dispensation preferences such as type of label, type of cap, message preferences, language preferences, or the like.

The member data 112 may be accessed by various devices in the pharmacy, e.g., the high volume fulfillment center, to obtain information utilized for fulfillment and shipping of prescription orders. In some embodiments, an external order processing device 102 operated by or on behalf of a member may have access to at least a portion of the member data 112 for review, verification, or other purposes.

In some embodiments, the member data 112 may include information for persons who are patients of the pharmacy but are not members in a benefit plan being provided by the benefit manager. For example, these patients may obtain drug directly from the pharmacy, through a private label service offered by the pharmacy, the high volume fulfillment center, or otherwise. In general, the use of the terms member and patient may be used interchangeably herein.

The claims data 114 includes information regarding pharmacy claims adjudicated by the PBM under a drug benefit program provided by the PBM for one, or more than one, plan sponsors. In general, the claims data 114 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility. Additional information may be included.

In some embodiments, other types of claims beyond prescription drug claims may be stored in the claims data 114. For example, medical claims, dental claims, wellness claims, or other type of health care-related claims for members may be stored as a portion of the claims data 114.

In some embodiments, the claims data 114 includes claims that identify the members with whom the claims are associated. In some embodiments, the claims data 114 includes claims that have been de-identified (e.g., associated with a unique identifier but not with a particular, identifiable member).

The drug data 116 may include drug name (e.g., technical name and/or common name), other names by which the drug is known by, active ingredients, an image of the drug (e.g., in pill form), and the like. The drug data 116 may include information associated with a single medication or multiple medications.

The prescription data 118 may include information regarding prescriptions that may be issued by prescribers on behalf of patients, who may be members of the drug benefit plan, for example to be filled by a pharmacy. Examples of the prescription data 118 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 110 may be linked to associated member data 112, claims data 114, drug data 116, and/or prescription data 118.

The plan sponsor data 120 includes information regarding the plan sponsors of the benefit manager. Examples of the plan sponsor data 120 include company name, company address, contact name, contact telephone number, contact e-mail address, and the like.

The order processing device 102 may direct at least some of the operations of devices 122-144, recited above. In some embodiments, operations performed by one of these devices 122-144 may be performed sequentially, or in parallel with the operations of another device as may be coordinated by the order processing device 102. In some embodiments, the order processing device 102 tracks a prescription with the pharmacy based on operations performed by one or more of the devices 122-144.

In some embodiments, the system 100 may transport prescription drug containers (e.g., between one or more than one of the devices 122-144 in the high volume fulfillment center) by use of pallets. The pallet sizing and pucking device 122 may configure pucks in a pallet. A pallet may be a transport structure for a number of prescription containers, and may include a number of cavities. A puck may be placed in one or more than one of the cavities in a pallet by the pallet sizing and pucking device 122. A puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 102 based on prescriptions which the order processing device 102 decides to launch. In general, prescription orders in the order database 110 reside in one or more than one queues, and are generally launched in a first-in-first-out order. However, the order processing device 102 may use logic and a variety of factors to determine when and how prescriptions are to be launched. For example, some non-limiting factors which may alter the first-in-first-out order of launching prescriptions in a pharmacy include the age of the order, whether the order required an outreach to a physician or some other intervention, whether there are any performance guarantees with plan sponsors or members, the available inventory of a given pharmaceutical in view of existing prescriptions already launched which will require that pharmaceutical, the zip code to which the order will be shipped, the workload and volume of various parts of the pharmacy, whether valid paperwork for the order has been received, and/or similar orders for the same pharmaceutical that are already to be launched. The logic may be implemented directly in the pallet sizing and pucking device 122, in the order processing device 102, in both devices 102, 122, or otherwise. Once a prescription is set to be launched, a puck suitable for the appropriate size of container for that prescription may be positioned in a pallet by a robotic arm or pickers. The pallet sizing and pucking device 122 may launch a pallet once pucks have been configured in the pallet.

The loading device 124 may load prescription containers into the pucks on a pallet by a robotic arm, pick and place mechanism, or the like. In one embodiment, the loading device 108 has robotic arms or pickers to grasp a prescription container and move it to and from a pallet or a puck. The loading device 124 may also print a label which is appropriate for a container that is to be loaded onto the pallet, and apply the label to the container. The pallet may be located on a conveyor assembly during these operations, e.g., at the high volume fulfillment center.

The inspect device 126 may verify that containers in a pallet are correctly labeled and in the correct spot on the pallet. The inspect device 126 may scan the label on one or more than one container on the pallet. Labels of containers may be scanned or imaged in full or in part by the inspect device 126. Such imaging may occur after the container has been lifted out of its puck by a robotic arm, picker, or the like, or may be otherwise scanned or imaged while retained in the puck. In some embodiments, images and/or video captured by the inspect device 126 may be stored in the database 108 as order data 110.

The unit of use device 128 may temporarily store, monitor, label and/or dispense unit of use products. In general, unit of use products are prescription drug products that may be delivered to a patient or member without being repackaged at the pharmacy. These products may include pills in a container, pills in a blister pack, inhalers, and the like. Prescription drug products dispensed by the unit of use device 128 may be packaged individually or collectively for shipping, or may be shipped in combination with other prescription drugs dispenses by other devices in the high volume fulfillment center.

The automated dispensing device 130 may include one or more than one devices that dispense prescription drugs or pharmaceuticals into prescription containers in accordance with one or multiple prescription orders. In general, the automated dispensing device 130 may include mechanical and electronic components with, in some embodiments, software and/or logic to facilitate pharmaceutical dispensing that would otherwise be performed in a manual fashion by a pharmacist and/or pharmacist technician. For example, the automated dispensing device 130 may include high volume fillers that fill a number of prescription drug types at a rapid rate and blister pack machines that dispense and pack drugs into a blister pack. Prescription drugs dispensed by the automated dispensing devices 130 may be packaged individually or collectively for shipping, or may be shipped in combination with other prescription drugs dispenses by other devices in the high volume fulfillment center.

The manual fulfillment device 132 may provide for manually fulfillment of prescriptions. For example, the manual fulfillment device 132 may receive or obtain a container and enable fulfillment of the container by a pharmacist or pharmacy technician. In some embodiments, the manual fulfillment device 132 provides the filled container to another device in the system 100 to be joined with other containers in a prescription order for a patient or member. In general, a manual fulfillment may include operations at least partially performed by a pharmacist or pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter). Prescription drugs dispensed by the manual fulfillment device 132 may be packaged individually or collectively for shipping, or may be shipped in combination with other prescription drugs dispenses by other devices in the high volume fulfillment center.

The review device 134 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 134 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like.

The imaging device 136 may image containers once they have been filled with pharmaceuticals. The imaging device 136 may measure the fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 102, and/or stored in the database 110 as part of the order data 110.

The cap device 138 may be used to cap or otherwise seal a prescription container. In some embodiments, the cap device 138 may secure a prescription container with a type of cap in accordance with a patient preference (e.g., a preference regarding child resistance), a plan sponsor preference, a prescriber preference, or the like. The cap device 138 may also etch a message into the cap, although this process may be performed by a subsequent device in the high volume fulfillment center.

The accumulation device 140 accumulates various containers of prescription drugs in a prescription order. The accumulation device 140 may accumulate prescription containers from various devices or areas of the pharmacy. For example, the accumulation device 140 may accumulate prescription containers from the unit of use device 128, the automated dispensing device 130, the manual fulfillment device 132, and the review device 134, at the high volume fulfillment center. The accumulation device 140 may be used to group the prescription containers prior to shipment to the member or otherwise.

The packing device 142 packages a prescription order in preparation for shipping the order. The packing device 142 may box, bag, or otherwise package the fulfilled prescription order for delivery. The packing device 142 may further place inserts into the packaging. For example, bulk prescription orders may be shipped in a box, while other prescription orders may be shipped in a bag which may be a wrap seal bag. The packing device 142 may label the box or bag with the address and a recipient's name. The packing device 142 may sort the box or bag for mailing in an efficient manner (e.g., sort by delivery address). The packing device 142 may include ice or temperature sensitive elements for prescriptions which are to be kept within a temperature range during shipping in order to retain efficacy or otherwise. The ultimate package may then be shipped through postal mail, through a mail order delivery service that ships via group and/or air (e.g., UPS, FedEx, or DHL), through delivery service, through a locker box at a shipping site (e.g., Amazon locker or a PO Box), or otherwise.

The unit of use packing device 144 packages a unit of use prescription order in preparation for shipping the order. The unit of use packing device 144 may include manual scanning of containers to be bagged for shipping to verify each container in the order.

While the system 100 in FIG. 1 is shown to include single devices 102, 106, 122-144 multiple devices may be used. The devices 102, 106, 122-144 may be the same type or model of device or may be different device types or models. When multiple devices are present, the multiple devices may be of the same device type or models or may be a different device type or model. The types of devices 102, 106, 122-144 shown in FIG. 1 are example devices. In other configurations of the system 100, lesser, additional, or different types of devices may be included.

Moreover, the system 100 shows a single network 104; however, multiple networks can be used. The multiple networks may communicate in series with each other to link the devices 102, 106, 122-144 or in parallel to link the devices 102, 106, 122-144. Multiple devices may share processing and/or memory resources. The devices 102, 106, 122-144 may be located in the same area or in different locations. For example, the devices 102, 106, 122-144 may be located in a building or set of adjoining buildings. The devices 102, 106, 122-144 may be interconnected (e.g. by conveyors), networked, and/or otherwise in contact with one another or integrated with one another, e.g., at the high volume fulfillment center. In addition, the functionality of a device may be split among a number of discrete devices and/or combined with other devices.

Figure 2:
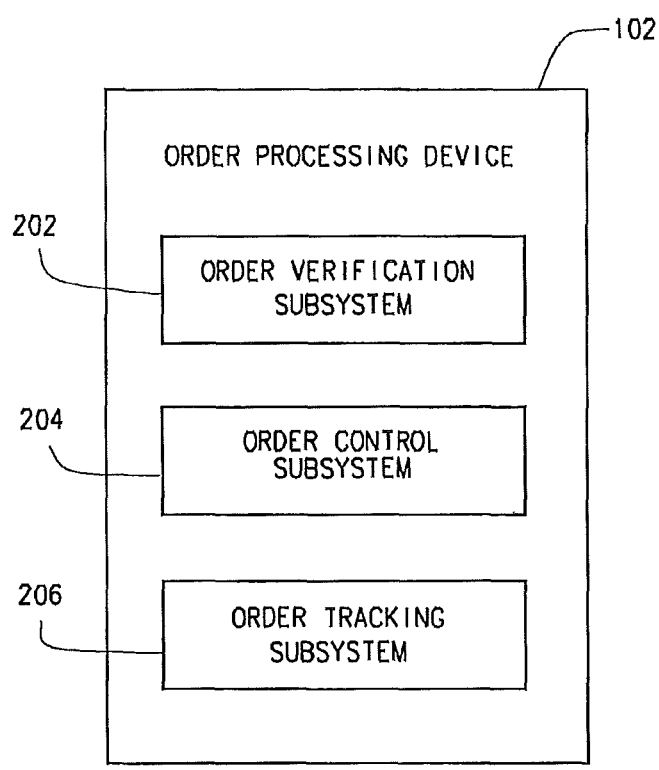
FIG. 2 is a block diagram of an example order processing device that may be deployed within the system of FIG. 1, according to an example embodiment.

FIG. 2 illustrates the order processing device 102, according to an example embodiment. The order processing device 102 may be used by one or more than one operator to generate prescription orders, make routing decisions, make prescription order consolidation decisions, and/or view order status and other order related information. For example, the prescription order may be comprised of order components. The order processing device 102 may receive instructions to fulfill an order without operator intervention. An order component may include a prescription drug fulfilled by use of a container through the system 100. The order processing device 102 may direct an order component to the manual fulfillment device 132 and/or to the review device 134, and direct other components to the automated dispensing device 130. The order processing device 102 may direct order components to the accumulation device 140 for aggregation before shipping. The order processing device 102 may direct the order components directly to the packing device 142 if the prescription order does not require accumulation from various areas of the pharmacy for completion. The order processing device 102 may be deployed in the system 100, or may otherwise be used.

The order processing device 102 may include an order verification subsystem 202, an order control subsystem 204, and/or an order tracking subsystem 206. Other subsystems may also be included in the order processing device 102.

The order verification subsystem 202 may communicate with the benefit manager device 106 to, verify the eligibility of the member, review the formulary to determine appropriate co-pay, coinsurance, and deductible for the prescription drug, and/or perform a DUR. Other communications between the order verification subsystem 202 and the benefit manager device 106 may be performed for a variety of purposes.

The order control subsystem 204 controls various movements of the containers and/or pallets along with various filling functions during their progression through the system 100. In some embodiments, the order control subsystem 204 may identify the prescribed drug in one or more than one prescription order as capable of being fulfilled by the automated dispensing device 130. The order control subsystem 204 may determine which prescriptions are to be launched, and may determine that a pallet of automated-fill containers is to be launched. The order control subsystem 204 may determine that an automated-fill prescription of a specific pharmaceutical is to be launched, and may examine a queue of orders awaiting fulfillment for other prescription orders which will be filled with the same pharmaceutical. The order control subsystem 204 may then launch orders with similar automated-fill pharmaceutical needs together in a pallet to the automated dispensing device 130. As the devices 122-144 may be interconnected by a system of conveyors or other container movement systems, the order control subsystem 204 may control various conveyors to deliver the pallet from the loading device 124 to the manual fulfillment device 132, for example.

The order tracking subsystem 206 may track a prescription order as it progresses (or stops) toward fulfillment. The order tracking subsystem 206 may track, record and/or update order history, order status or the like. The order tracking subsystem 206 may store data locally (e.g., in a memory) or as a portion of the order data 110 stored in the database 108.

Figure 3:
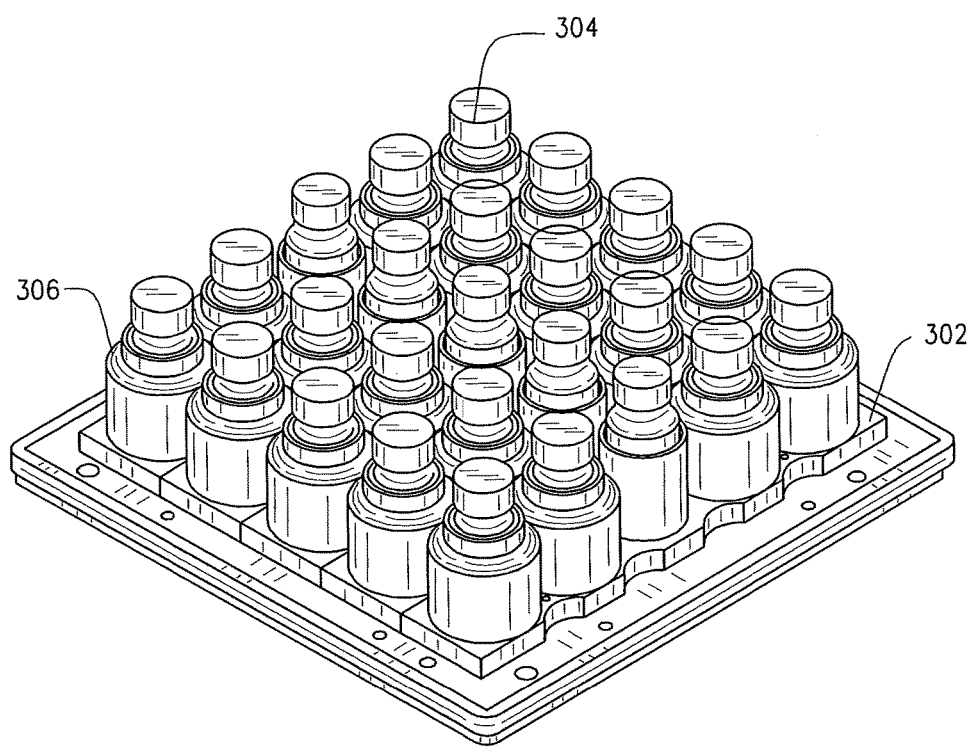
FIG. 3 is a perspective view of a pallet, according to an example embodiment.

FIG. 3 illustrates a pallet 302, according to an example embodiment. The pallet 302 may be used in the system 100 of FIG. 1 (e.g., by the automated dispensing device 122), or may be otherwise used. The pallet 302 may be a transport structure for a number of prescription containers 304, and may include a number of cavities 306. While the pallet 302 is shown to include 25 cavities in a five by five cavity row/column configuration, other numbers of categories and/or cavity configurations of varying shapes, size, and/or dimensions may be used. In some embodiments, other carriers beyond the pallet 302 and/or no carrier may be used to move containers or groups of containers through the system 100 by the conveyors, to the devices 122-144, or otherwise.

The pallet 302 may retain one or more than one container 304. A container 304 is generally cylindrical and may be of one or a variety of sizes utilized by a pharmacy for fulfillment of a prescription. For example, a pharmacy may have two different sized containers or three different sized containers. Any number of different sized containers may be used with the pallet 302. While the container 304 is generally denoted as being used with the pallet 302, the containers 304 may otherwise be used in the system 100 or in a different system. Shapes beyond cylindrical shapes may be used for the containers 304.

The automated dispensing device 130 may be used, for example, to dispense commonly prescribed drugs in an automatic or semiautomatic method into containers. Drugs may be dispensed in connection with filling one or more than one prescriptions (or portions of prescriptions). Drugs dispensed by the automated dispensing device 130 may be tablets, pills, capsules, caplets, or other types of drugs suitable for dispensing by the automated dispensing device 130.

Figure 4:
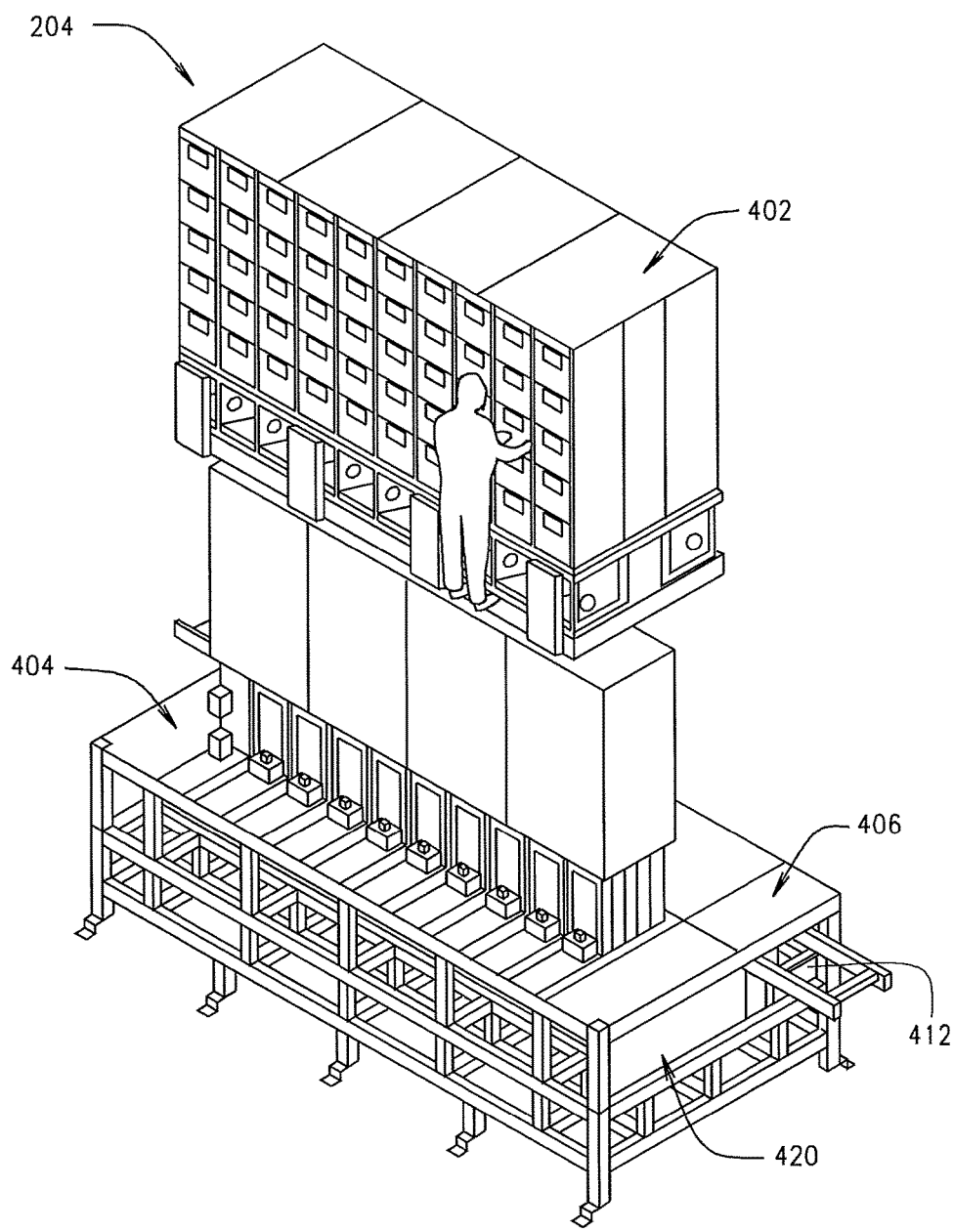
FIG. 4 is perspective view of an automatic dispensing device and a spill detection system, according to an example embodiment.

FIG. 4 illustrates an automated dispensing device 130, according to an example embodiment. The automated dispensing device 130 enables dispensing of a number of different types of pharmaceuticals in an automatic or semiautomatic manner. The automated dispensing device 130 includes a filling cabinet 402, a prefill assembly 404, and a pallet assembly 406. The filling cabinet 402 stores pharmaceuticals to be dispensed into containers via the prefill assembly 404 and dispenses measured quantities of pharmaceuticals into the prefill assembly 404. The prefill assembly 404 stores the measured quantities of pharmaceuticals and dispenses the measured quantities of pharmaceuticals received from the filling cabinet 402 into containers 304 on a pallet 302 while in the pallet assembly 406.

A pallet conveyor 412 may transport the pallets 302 through some or all of the devices within the system 100, such as the automated dispensing device 130. The pallet assembly 406 receives the pallets 302 via the pallet conveyor 412 and moves the pallets 302 within the pallet assembly 406 such that pharmaceuticals dispensed by the automated dispensing subsystem 204 are dispensed into the containers 304 on the pallet 302. Although pallets are generally described herein as employed to move a group of containers through the system 100, trays or other types of carriers may, in some embodiments, be employed to move a group of containers through the system 100.

The filling cabinet 402 may be physically housed above the prefill assembly 404 and the pallet assembly 406. For example, the filling cabinet 402 may be located on a first, upper floor and the prefill assembly 404 and the pallet assembly 406 may be located on a second, lower floor below the filling cabinet 402. These components may be otherwise positioned. For example, some portion of the filling cabinet 402 may extend below the first floor.

FIG. 4 also illustrates a spill detection system 420, according to an example embodiment. As shown in FIG. 4, the spill detection system 420 has been installed within and through the pallet assembly 406 of the automated dispensing device 130. For ease of reference herein, the spill detection system 420 will be discussed in the context of its installation and use with the automated dispensing device 130. However, the spill detection system 420 may be used in connection with one or more than one of devices 122-144, in connection with different automated or semi-automated dispensing devices, elsewhere within or external to a pharmacy or the high volume fulfillment center, or otherwise.

Additionally, as shown in FIG. 4, the spill detection system 420 is illustrated as being positioned adjacent to the pallet conveyor 412 within the pallet assembly 406. However, the spill detection system 420 could be installed so as to extend around or below pallet conveyor 412, or be positioned elsewhere within or around the automated dispensing device 130. As most spills are likely to occur at or beneath the prefill assembly 404, the spill detection system 420 is shown herein beneath the prefill assembly 404. However, this is merely a non-limiting example embodiment of an implementation of the spill detection system 420.

Figure 5:
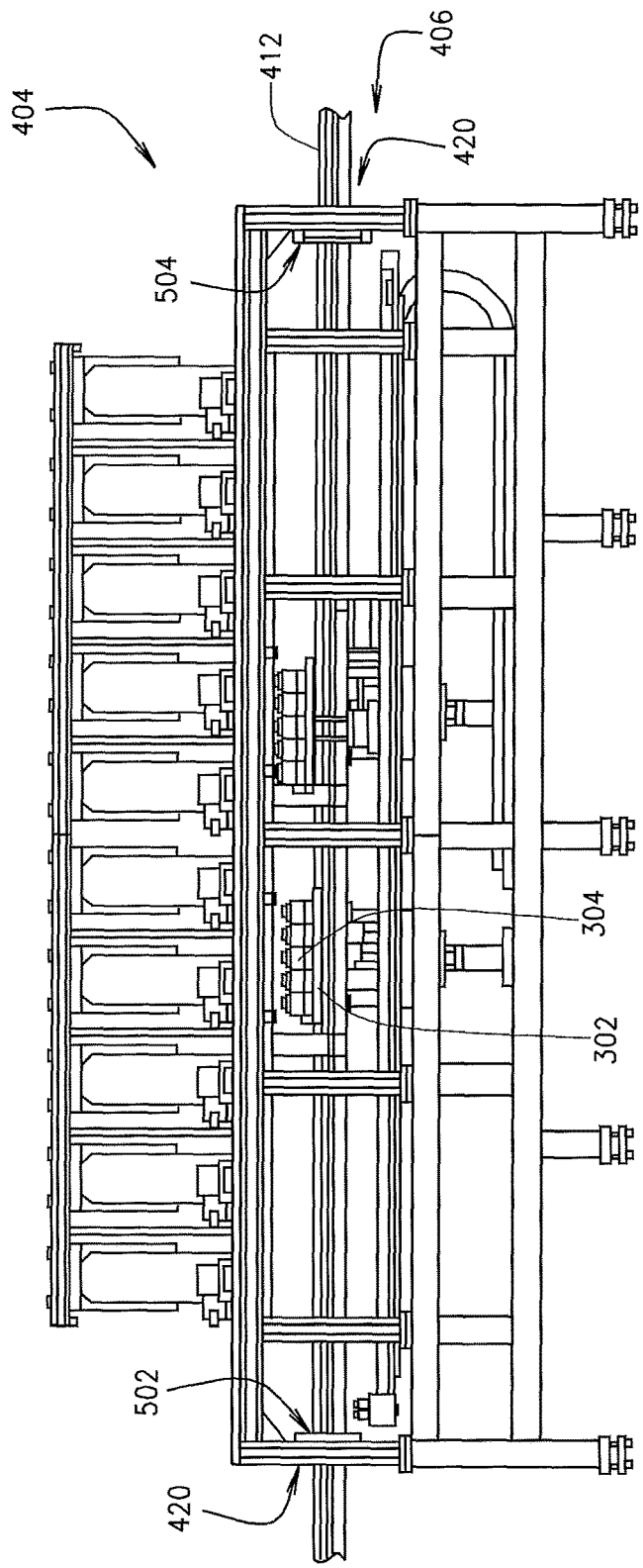
FIG. 5 is a side elevation view of a prefill assembly and a pallet assembly of an automatic dispensing device, and a spill detection system, according to an example embodiment.
Figure 6:
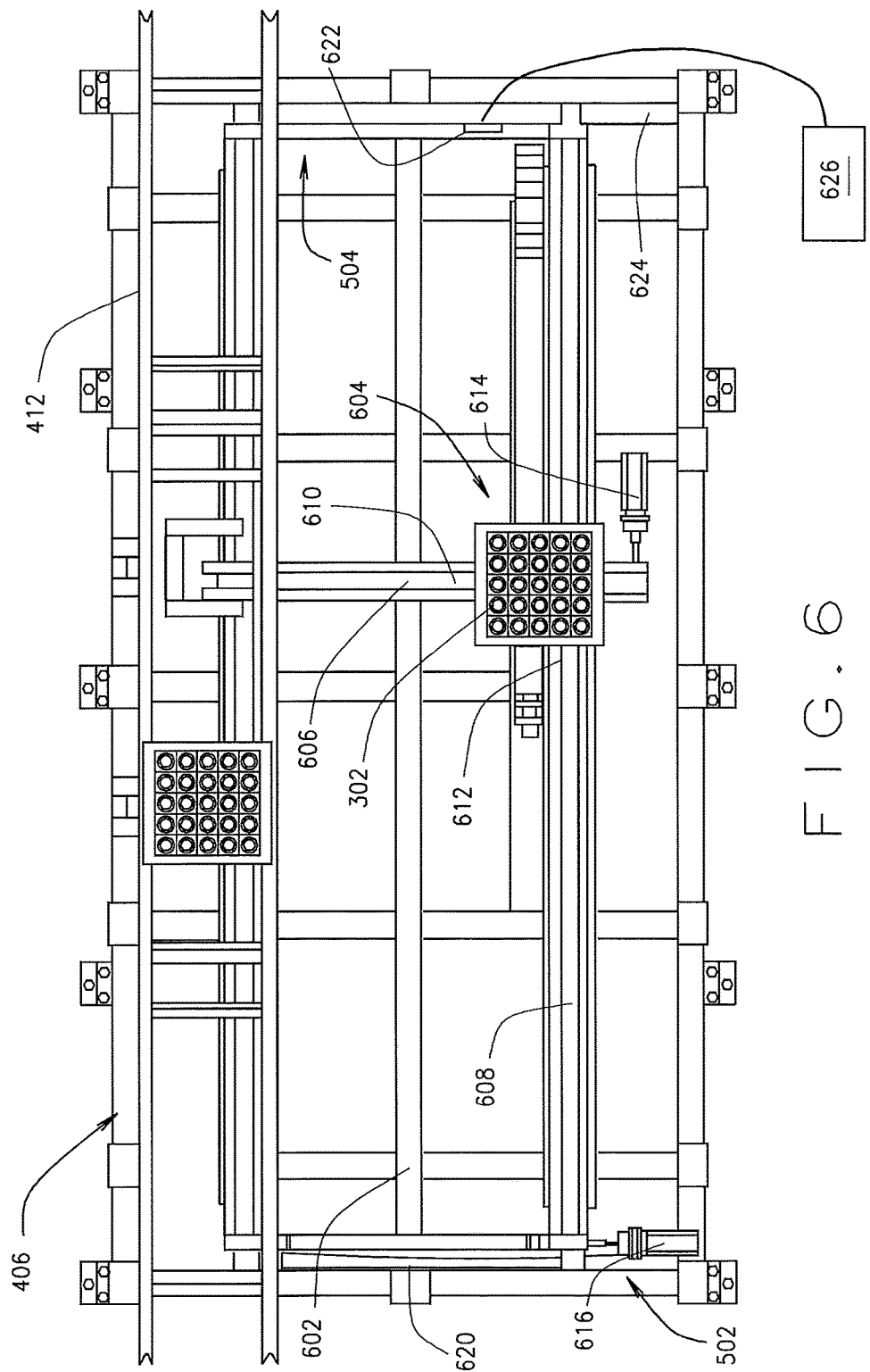
FIG. 6 is a top plan view of a pallet assembly of an automatic dispensing device and a spill detection system, according to an example embodiment.
Figure 7:
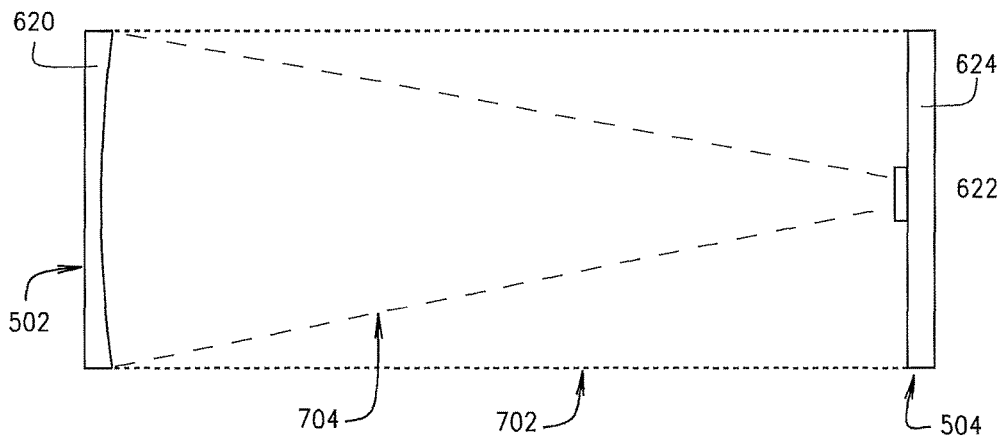
FIG. 7 is a top plan block diagram of a spill detection system, according to an example embodiment.

FIG. 5 illustrates a side elevation view of the prefill assembly 404, the pallet assembly 406, and the spill detection system 420 of FIG. 4. The spill detection system 420 may include a mirror portion 502 and a camera portion 504. FIG. 6 illustrates a top plan view of the pallet assembly 406, in which example embodiments of the mirror portion 502 and the camera portion 504 can be seen in additional detail. FIG. 7 illustrates a top plan view of the spill detection system 420 removed from the context of the pallet assembly 406, according to an example embodiment.

As shown in FIG. 6, the pallet assembly 406 may include a pallet assembly frame 602 to provide support to the pallet assembly 406, including the pallet conveyor 412 and an x-y movement apparatus 604. The x-y movement apparatus 604 may alter the position of the pallet 302 within the pallet assembly 406 of the automated dispensing device 130. The x-y movement apparatus 604 may include an x-component 606 and a y-component 608. The x-component 606, in operation, may move a pallet 302 in a direction perpendicular to the pallet conveyor 412. The x-component 606 may include an x-axis support arm 610 that supports the pallet 302 as it moves within the pallet assembly 406 and an x-component motor 614 that actuates the x-component 606 of the x-y movement apparatus 604. The y-component 608, in operation, may move a pallet 302 in a direction parallel to the pallet conveyor 412. The y-component 608, may include a y-axis support arm 612 that supports the pallet 302 as it moves within the pallet assembly 406 and a y-component motor 616 that actuates the y-component 608 of the x-y movement apparatus 604. The x-y movement apparatus 604 may engage and move the pallet 302 within the pallet assembly 406 of the automated dispensing device 130 such that a desired container 304 in a pallet 302 is moved to an appropriate position below the prefill assembly 404 for filling the desired container 304 with a desired pharmaceutical.

The pallet assembly 406 may also include a lift apparatus 618. The lift apparatus 618 may engage the pallet 302 and lift it such that a desired container 304 on the pallet 302 is aligned to receive a pharmaceutical from the prefill assembly 404. In an example, the desired container 304 may be positioned directly (or substantially directly) below the buffer tube opening of a buffer tube in the prefill assembly 404. The buffer tube may be in communication with a bin in the filling cabinet 402 which holds the desired pharmaceutical to be dispensed into the desired container 304. Upon releasing pharmaceuticals into the desired container 304, some of the pharmaceuticals may spill.

As can be seen in FIG. 6, but as better seen in FIG. 7, the mirror portion 502 of the spill detection system 420 may include a mirror 620. The camera portion 504 may include a camera 622 and a light panel 624. The camera 622 may be in communication with a control unit 626. The mirror 620 may be a concave mirror. In an example, the concave mirror may be approximately parabolic. In an example embodiment, the camera 622 may be a COGNEX® In-Sight 7000 Series Vision System camera. In another example embodiment, the camera 622 may be COGNEX® In-Sight 7402-01 camera. In an example, the camera 622 can be a grayscale camera, which may produce a full image of 1280×1024 pixels. The camera 622 may be a medium-to-high resolution camera, as that term is understood in the art. In an example embodiment, the camera 622 may be capable of capturing approximately thirty to ninety images per second, or one image about every ten to thirty milliseconds. In an example, the camera 622 can capture and compare successive images to detect movement of a spilled pharmaceutical, e.g., a pharmaceutical product, for example, a pill, a tablet, a capsule, a gel capsule, and the like.

Between the mirror portion 502 and the camera portion 504 is a filling area 702 above which a container 304 may be filled with a pharmaceutical. The filling area 702 is therefore an area in which a spill may occur. The mirror 620 may extend the entire width of the filling area 702. In an example embodiment, the mirror 620 can extend past the width of the filling area 702 to cover the width of an area in which a prescription may spill. The mirror 620 may be a polished stainless steel mirror. The mirror 620 is curved so that an image along the upper line 711 is reflected along line 712 to the camera 622. Likewise, an image along the lower edge of the filling area 702 is reflected by the mirror portion 502 to and edge of the camera 622. The mirror 620 can also be curved so that it reflects an image at the top of the viewing area to a top of bottom edge of the camera. The camera 622 may therefore be aimed at the mirror 620 across the filling area 702. The camera 622 is positioned at the center of the filling area 702 and is positioned to point at the center of the mirror 702. The light panel 624 may emit light toward the mirror 620, which reflects off of the mirror 620 back toward the camera 622. However, the immediate field of view 704 of the camera 622 may not cover a portion of the filling area 702, as shown in FIG. 7. The camera 622 may therefore be focused on the reflection of filling area 702 in the mirror 620, creating a distant field of view which may be coextensive with filling area 702. In an example embodiment, the camera 622 may be focused on the reflection of camera portion 504 in mirror 620.

Figure 8:
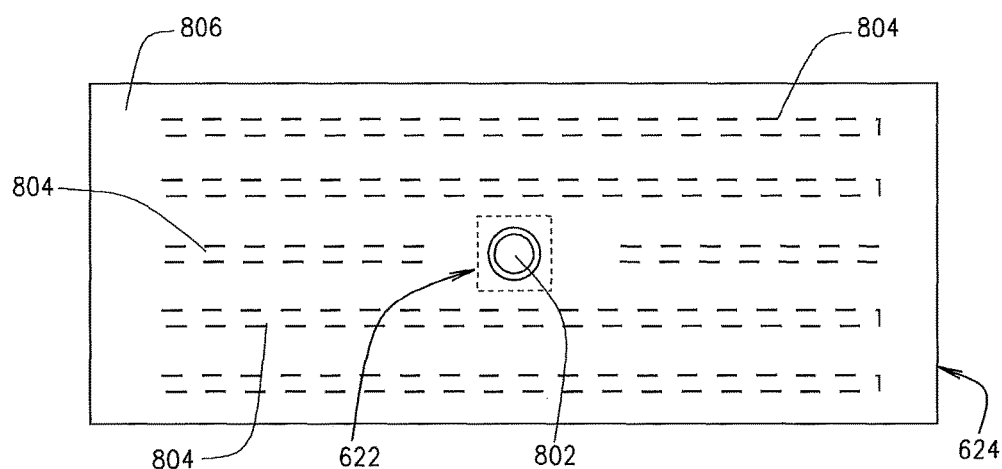
FIG. 8 is a front elevation view of a camera portion of a spill detection system, according to an example embodiment.

FIG. 8 illustrates a front elevation view of the camera portion 504, according to an example embodiment. The camera 622 may include a lens 802. The light panel 624 may include one or more than one light source 804 and a light diffuser 806. The lens 802 may be a telecentric lens. Alternatively, or in addition, the concave curve of the mirror 620 may approximate the use of a telecentric lens on camera 622, according to an example embodiment. As illustrated in FIG. 8, only the lens 802 of the camera 622 is visible. The camera is shown in phantom because it may be positioned behind the light panel 624. In such an example embodiment, the lens 802 may extend through a hole in the light panel 624. In a different example embodiment, the camera 622 may be positioned in front of the light panel 624.

The one or more than one light source 804 (referred to hereinafter for ease of reference as light sources 804) is shown in phantom in FIG. 8 due to their positioning behind the light diffuser 806. The light sources 804 may be elongated fluorescent bulbs, as illustrated in FIG. 8. However, any desirable type of light source may be used. As non-limiting examples, the light sources 804 may be LED lights, fluorescent lights, incandescent lights, or combinations thereof. Additionally, although the light sources 804 are illustrated with specific sizes, in specific orientations and arrangements in FIG. 8, it will be understood that this is not limiting. The light sources 804 may be arranged in any desirable combination, position, and arrangement. The light diffuser 806 may be a translucent material which spreads and softens light passing through the light diffuser 806 from the light sources 804.

The optical subsystem, e.g., the mirror 620 and the camera 622, operate to image a pharmaceutical product that has spilled and is beneath the filling area of the prefill assembly 404 and the container carrier, e.g., pallet and other carrier.

Figure 9:
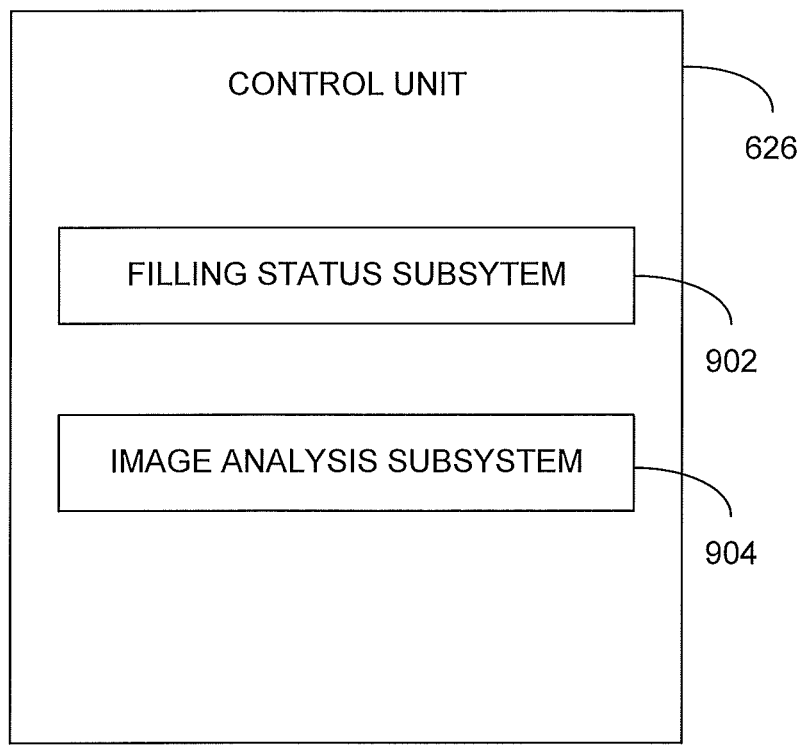
FIG. 9 is block diagram of a control unit of a spill detection system, according to an example embodiment.

FIG. 9 illustrates the control unit 626, according to an example embodiment. The control unit 626 may be deployed in the spill detection system 420, or may otherwise be used. The control unit 626 may operate at the direction of the order processing device 102, or may be integral with the order processing device or otherwise. The control unit 626 may include a filling status subsystem 902 and an image analysis subsystem 904. The control unit 626 may be responsible for enabling the spill detection system 420, for example when a pallet 302 is positioned for filling. The control unit 626 may also direct the camera 622 to capture images, and may analyze the captured images for any possible spills. The control unit 626 may be communicatively coupled to one or more than one component in the camera portion 504, such as the camera 622 and the light sources 804. The control unit 626 may control the light sources 804 to illuminate the filling area 702 when a filling operation is being conducted.

The filing status subsystem 902 may enable the control unit 626 to determine whether and when a pallet 302 has been moved into or above the filling area 702 for filling. The filling status subsystem 902 may then signal the components of the camera portion 504 to enable imaging. The image analysis subsystem 904 may analyze captured images from the camera 622 to determine whether a spill has occurred. In an example, the image analysis subsystem 904 may compare successive images captured by the camera 622 to determine a change in the images to determine whether a pharmaceutical product has been filled, e.g., during filing a pharmaceutical order in the high volume fulfillment center.

Figure 10:
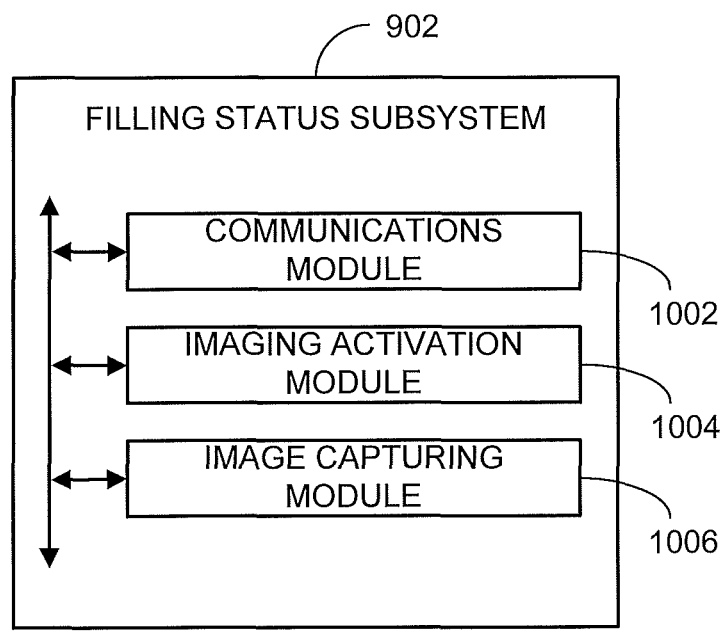
FIG. 10 is block diagram of a filling status subsystem of the control unit of FIG. 9, according to an example embodiment.

FIG. 10 illustrates an example filling status subsystem 902 that may be deployed in the control unit 626, or may be otherwise deployed in another system. One or more modules are communicatively coupled and included in the filling status subsystem 902 to enable the filling status subsystem 902 to identify whether and when a pallet 302 has been moved into or above the filling area 702 for filling, and subsequently enable the components of the camera portion 504. The modules of the filling status subsystem 802 that may be included are a communication module 1002, an imaging activation module 1004, and an imaging module 1006. Other modules may also be included.

In some embodiments, the modules of the filling status subsystem 902 may be distributed so that some of the modules are deployed in other devices within the pharmacy. In one embodiment, the modules are deployed in memory and executed by a processor coupled to the memory. The functionality contained within the modules 1002-1006 may be combined into a lesser number of modules, further divided among a greater number of modules, or redistributed among existing modules. Other configurations including the functionality of the modules 1002-1006 may be used.

The communication module 1002 may manage communication with, for example, the pallet assembly 406 of automated dispensing device 130. Thereby, the communication module 1002 may receive a signal from the automated dispensing device 130 when the pallet assembly 406 has moved a pallet 302 into the filling area 702. The imaging activation module 1004 may send a signal to the camera portion 504 to enable the camera 622 and light sources 804 of light panel 624. The imaging module 1006 may instruct the camera 622 to begin capturing images of the filling area 702.

Figure 11:
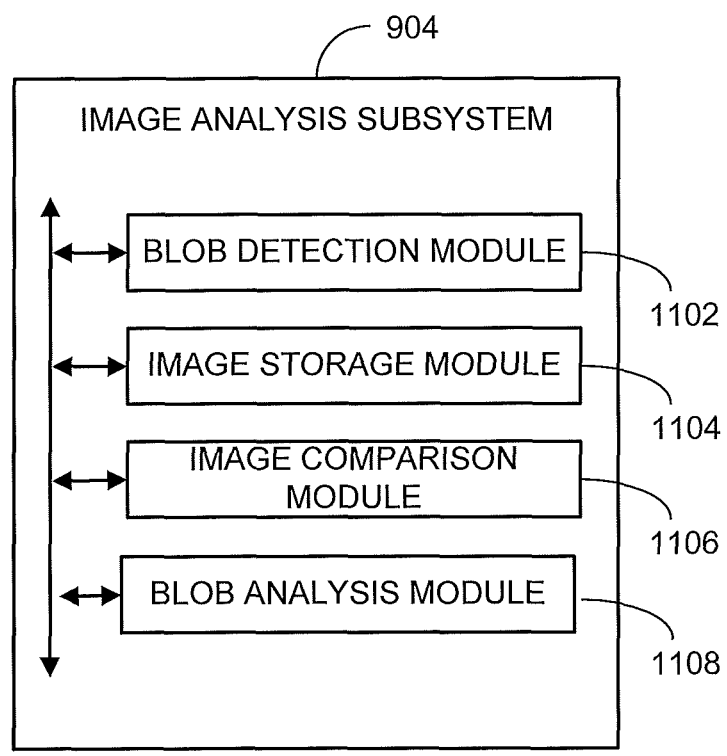
FIG. 11 is block diagram of an image analysis subsystem of the control unit of FIG. 9, according to an example embodiment.

FIG. 11 illustrates an example image analysis subsystem 904 that may be deployed in the control unit 626, or may be otherwise deployed in another system. One or more modules are communicatively coupled and included in the image analysis subsystem 904. The modules of the image analysis subsystem 904 that may be included are an object detection module 1102, an image storage module 1104, an image comparison module 1106 and/or an analysis module 1108. Other modules may also be included.

In some embodiments, the modules of the image analysis subsystem 904 may be distributed so that some of the modules are deployed in other devices within the pharmacy. In one embodiment, the modules are deployed in memory and executed by a processor coupled to the memory. The functionality contained within the modules 1102-1108 may be combined into a lesser number of modules, further divided among a greater number of modules, or redistributed among existing modules. Other configurations including the functionality of the modules 1102-1108 may be used.

The object detection module 1102 may be in communication with camera 622, and may receive an image captured by camera 622. The object detection module 1102 may make a determination as to whether an object, e.g., a blob, is visible in the received image captured by the camera 622. In an example embodiment, such determination may be made by locating any artifacts in the captured image above or below a predetermined number of pixels. However, alternative techniques for detecting an object in an acquired image may also be used, such as based on a comparison of a captured image to a baseline image stored in an electronic memory accessible by the image analysis subsystem 904, as a non-limiting example. Such a comparison may utilize the functionality of the image comparison module 1106, and/or the object analysis module 1108, discussed below.

The object detection module 1102 may be a blob detection module that uses mathematical methods that are aimed at detecting regions in a digital image that differ in properties, such as brightness or color, compared to areas surrounding those regions. A blob is a region of a digital image in which some properties are constant or vary within a prescribed range of values. In an example embodiment, all the points in a blob can be considered in some sense to be similar to each other. Blob detection can be performed by using several different methods including: (1) differential methods, which are based on derivatives of the function with respect to position (e.g., a pharmaceutical falling into the field of view, in the Z direction), and (2) methods based on local extrema, which are based on finding the local maxima and minima of the function (significant changes from one pixel to an adjacent pixel at such a size that is consistent with a pharmaceutical). Other methods may be used. A blob may, in some embodiments, be defined as an area of connected pixels of similar intensity or color, which appear in images from the camera 622 when a pharmaceutical drops beneath the fill area. It will be recognized that the more pixels that are connected, the larger the blob area that can be detected in the image. The use of the light source 624 illuminates the field of view. As a result of such usage spill dark spots, e.g., the blobs, appear in the images.

The image storage module 1104 may be in communication with an electronic memory, for storing and/or accessing captured images in the electronic memory. The image storage module 1104 may track and store an image or a series of consecutive captured images when an object is detected therein. The image storage module 1104 may therefore track whether an object was present on any stored previous image. The image storage module 1104 may also clear stored images from the electronic memory when it is determined that such images do not show a spill.

Image comparison module 1106 may receive images for comparison to one another. In an example embodiment, image comparison module 1106 may receive a captured image from camera 622 or object detection module 1102, and compare the captured image with a stored image received from image storage module 1104. The image comparison module 1106 may compare any objects located by the object detection module 1102 in the captured image with any object previously identified by the object detection module 1102 in a stored image, to determine if the position of the object has moved from one image to the other. In an example embodiment, the image comparison module 1106 may utilize data from the object analysis module 1108, discussed below, to determine by how much an object has moved, and/or whether the object has changed size and/or shape.

Object analysis module 1108 may receive a captured image and/or a stored image, and may analyze any objects identified in such image. The object analysis module 1108 may make a pixel by pixel comparison of an image, or may utilize other pixel analysis techniques as are known in the art. The object analysis module 1108 may provide information regarding the size, shape, and/or position of the object to the image comparison module 1106.

Object detection may be performed to detect a misspackaged pharmaceutical. First, an image from the camera 622 is captured by the object detection module 1102 that represents the entire area and a change in the image is determined and stored (e.g., the position and size of anything that could be a pharmaceutical) by the image comparison module 1106. These areas of change are then re-analyzed locally for contrast and size by the image comparison module 1106. The image comparison module 1106 then compares over consecutive images. A false positive analysis is performed by the analysis model 1108. Areas of change that are too close to each other in consecutive images are ignored by the analysis model 1108 as false positives. Such false detection by the analysis model 1108 may be due to dust, flying or crawling insects, or a dark spot on the mirror/backlight. If an area of change in the image is accepted as not a false positive, then the image is stored by the image storage module 1104 as a detection occurrence.

When detection occurs by the analysis model 1108 on consecutive images, the size (pixels) and location are stored by the image storage module 1104. Then consecutive images are analyzed for a same area of interest by the image comparison module 1106. In an example embodiment, more than three images are analyzed by the image comparison module 1106 (as may be deployed in the camera 622, the control unit 626, or otherwise). In an example embodiment, four or more images are analyzed. The subsequent images are analyzed and the maximum count and maximum pixel area for these images is added to an accumulator. This multiple images can be used to minimize the multiple counting of pharmaceutical as they are seen in multiple image frames. The accumulator runs for a period of time equivalent to the polling interval of the control unit 626, and is then reset.

Figure 12:
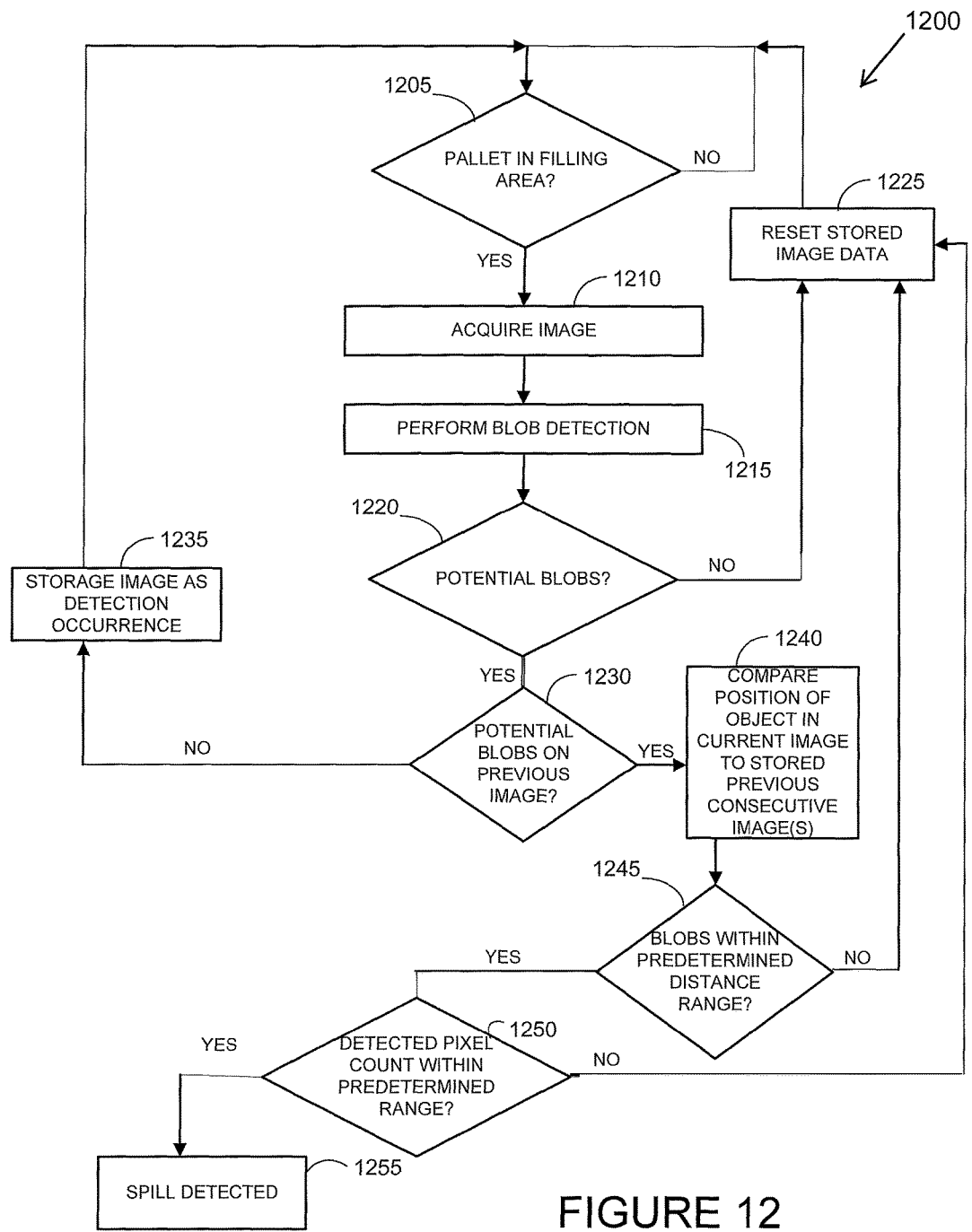
FIG. 12 is a flow diagram of a method for detecting spills, according to an example embodiment.

FIG. 12 illustrates a method 1200 for spill detection, according to an example embodiment. The method 1200 may be performed by the spill detection system 420 as instructed by control unit 626, or may be otherwise performed.

At block 1205, a determination is made (e.g., by the filling status subsystem 902) of whether a pallet 302 has been moved into the filling area 702 for filling. If not, the method 1200 repeats these operations until a pallet 302 has been moved into the filling area 702. Once a pallet has been moved into the filling area 702, as discussed above, a camera portion 504 is activated (e.g., the imaging activation module 1004) and causes the camera 622 (e.g., by the image capturing module 1006) to begin capturing images. At block 1210, an image is acquired by the camera 622. At block 1215, a determination is made (e.g., by the object detection module 1102) whether an object is present in the acquired image. At block 1220, where no objects are detected, the method 1200 advances to block 1225 where the electronic memory (e.g., caused by the image storage module 1104) discards any stored images, along with the acquired image. In some embodiments, stored images may be retained until a predetermined number of consecutive image captures do not contain an object. The method then returns back to block 1205.

However, at block 1120, when an object is detected, a determination is made (e.g., by the image storage module 1104) whether there are any previously stored consecutive images on which an object appears. Where the previous image or consecutive images did not contain objects, the captured image is stored in electronic memory as a possible detection occurrence (e.g., by the image storage module 1104) at block 1235. The method then returns to block 1205. However, at block 1230, where determination is made that there is at least one previous consecutive image in storage with a potential object, the method advances to block 1240.

At block 1240, a comparison of the position of an object in the acquired image to the position of an object in one or more of the previous consecutive image(s) is made (e.g., by the image comparison module 1106). In some embodiments, a comparison may be made between non-sequential images, such as when an object appears in an image, then is not present in one or more images, and then reappears in a subsequent image. Such an event could occur, for example, if a spilled pharmaceutical appears in frame, then passes behind a piece of hardware such as x-y movement apparatus 604, and then reappears toward the bottom of the frame after passing behind the x-y movement apparatus 604. At block 1245, a determination is made (e.g., by the image comparison module 1106) as to whether the object in the acquired image and the object in one or more of the previous consecutive image(s) is within a predetermined range of distances from one another. In an example embodiment, the predetermined distance may be an expected range that a pill would fall due to gravity. In another example embodiment, the predetermined distance may be a predetermined number of pixels.

If an object, e.g., a blob in blob detection, has not moved within the predetermined range of distances from the previous image(s) to the acquired image, the method reverts to block 1225 any stored images, along with the acquired image are discarded (e.g., by the image storage module 1104 as caused by the electronic memory). The method 1200 then returns back to block 1205. However, where an object has moved within the predetermined range of distances from the previous image(s) to the acquired image, the method advances to block 1250. At block 1250, an object in the acquired image and/or an object in a previous consecutive image may be analyzed (e.g., by the object analysis module 1108) to determine whether the pixel count of such object is within a predetermined range. In an example embodiment, the predetermined pixel count range may correspond to an expected range of sizes of a pill or other pharmaceutical product. In another example embodiment, the pixel range may be between one and eighteen pixels. If no object is within the predetermined pixel count range, the method 1200 reverts to block 1225 discard any stored images, along with the acquired image are discarded (e.g., as caused by the electronic memory from the image storage module 1104). However, where an object is within the predetermined pixel count range, the method advances to block 1255 in which a spill is detected.

The operations in method 1200 need not be performed in the order described above. As a non-limiting example, the comparison of object positions from image to consecutive image may occur after the determination of object pixel count. Additionally, a spill may not be detected at block 1255 until a predetermined number of consecutive images are determined to contain an object that is within a predetermined pixel count range, and which the object has moved a distance that is within a predetermined range from each of the predetermined number of images to the next image. In an example embodiment, the predetermined number of consecutive images may be greater than three images, four images, greater than eight images or greater than twelve images.

Figure 13:
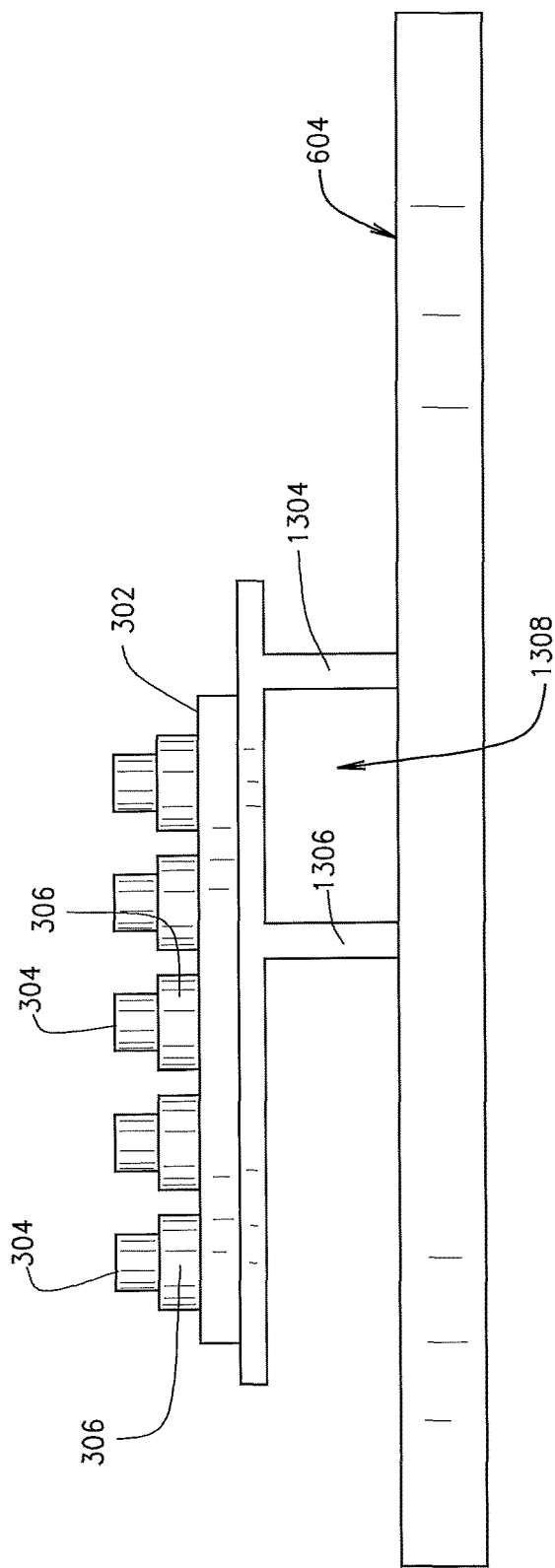
FIG. 13 is a side elevation view of a pallet mount, according to an example embodiment.

FIG. 13 illustrates a side elevation view of a pallet mount 1302, according to an example embodiment. As shown, a pallet mount 1302 may be positioned on the x-y movement apparatus 604, and a pallet 302 may be placed on the pallet mount 1302 for movement within the filling area 702. The side elevation view of FIG. 13 may be the angle at which the camera 622 views the pallet mount 1302 when the pallet mount 1302 moves a pallet 302 in the filling area 702 for filling. Pallet mount 1302 may include first and second legs 1304, 1306 which define a space 1308 there between. By including space 1308 between legs 1304, 1306, camera 622 may be able to image a spill that occurs and would be seen in the space 1308.

Figure 14:
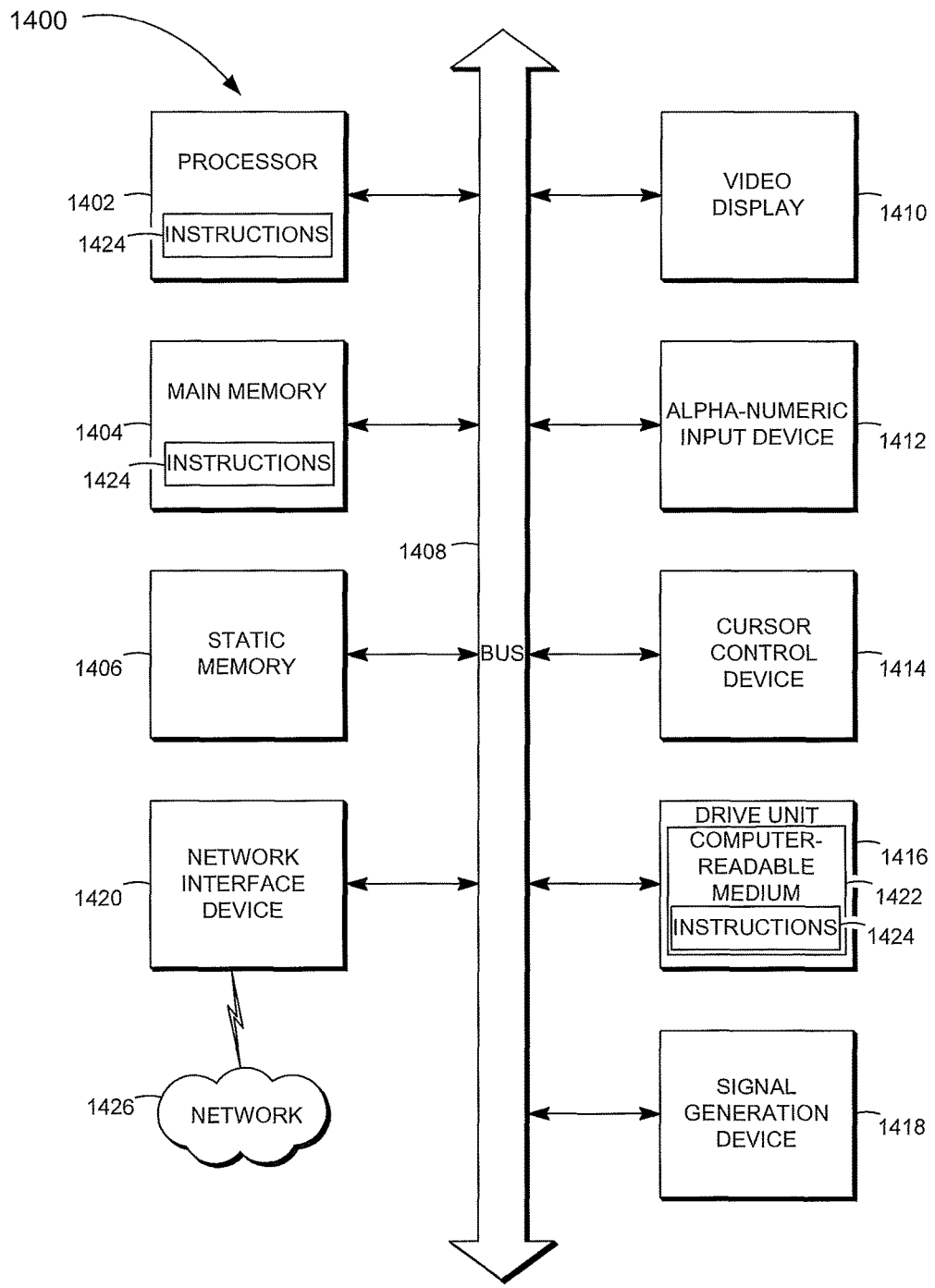
FIG. 14 is a block diagram of a machine in the example form of a computer system within which a set of instructions for causing the machine to perform any one or more of the methodologies discussed herein may be executed or stored.

FIG. 14 shows a block diagram of a machine in the example form of a computer system 1400 within which a set of instructions may be executed causing the machine to perform any one or more of the methods, processes, operations, or methodologies discussed herein. The device 102, 106, 122-144, 420, for example, may include the functionality of the one or more computer systems 1400.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU) a graphics processing unit (GPU) or both), a main memory 1404 and a static memory 1406, which communicate with each other via a bus 1408. The computer system 1400 further includes a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a drive unit 1416, a signal generation device 1418 (e.g., a speaker) and a network interface device 1420.

The drive unit 1416 includes a computer-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting computer-readable media.

The software 1424 may further be transmitted or received over a network 1426 via the network interface device 1420.

While the computer-readable medium 1422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium. In other examples, a computer-readable medium is any medium that satisfies statutory requirements and stores instructions for use by a machine.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The embodiments of the present disclosure generally provide for a plurality of circuits or other electrical devices, which can be used in units, modules, systems, and subsystems and the like. All references to such and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical/operational implementation that is desired. It is recognized that any circuit or other electrical device disclosed herein may include any number of microprocessors, discrete circuit components, integrated circuits, memory devices (e.g., FLASH, random access memory (RAM), read only memory (ROM), electrically programmable read only memory (EPROM), electrically erasable programmable read only memory (EEPROM), or other suitable variants thereof) and instructions (e.g., software) which co-act with one another to perform operation(s) disclosed herein. In addition, any one or more of the electric devices may be configured to execute a computer-program that is embodied in a computer readable medium that is programmed to perform any number of the functions and features as disclosed. The computer readable medium may be non-transitory or in any form readable by a machine or electrical component The inventive subject matter may be represented in a variety of different embodiments of which there are many possible permutations.

In an example embodiment, a system is provided with a distribution section and a manual section. The distribution section may be adjacent a conveyor, and may have a robot adapted to select and pick containers from a pallet on the conveyor. The robot is disposed to distribute the container. The manual section is disposed adjacent the conveyor. The manual section is adapted for filling of the container.

The present disclosure described a camera; it will be understood that a plurality of cameras can be used. The mirror can be shaped to reflect parts of the area where a pharmaceutical to respective cameras. For example, the mirror can include a number of parabolas that match the number of cameras.

The present disclosure makes reference to a robot and words of similar import. A robot can be a machine capable of carrying out a complex series of actions automatically. These complex series of actions may include picking up, orientating, positioning and/or releasing a container or other structure. The robot may be dedicated to a single series of movements or may be able to execute multiple series of movements. A robot may include a processor that received instructions and then executes instructions to control its movement. In another example, a robot may resemble a human being and replicate certain human movements and functions, e.g., a robot may move location, have an articulated arm, have grasping structures that replicate like fingers and do not damage containers, and the like.

Thus, methods and systems for spill detection have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A pharmaceutical filling system comprising:
a control device;
a mirror portion including a concave mirror;
a camera portion positioned opposite the mirror portion across a field of view, said camera portion including:
a camera for capturing images and connected to the control device and facing the mirror, wherein said camera is focused on a reflection in the mirror of the field of view, and
a light panel electrically connected to the control device and facing the mirror to illuminate the field of view;
wherein the control device is operable to:
receive a series of at least three consecutive images captured by the camera; and
determine whether an object in at least a portion of the captured images is a spilled pharmaceutical, wherein the spilled pharmaceutical is detected by a predetermined number of images from the camera showing the spilled pharmaceutical, and wherein determining whether the object is a spilled pharmaceutical includes determining whether the object appears in at least two non-sequential images of the captured images.

2. The system of claim 1, wherein the concave mirror is approximately parabolic.

3. The system of claim 1, wherein the camera includes a telecentric lens.

4. The system of claim 1 wherein the light panel includes one or more light sources positioned behind a translucent diffuser.

5. The system of claim 1 wherein the control device is configured to:
determine whether an object in an image has moved a distance which is within a predetermined distance from an object in a consecutive image to detect the spilled pharmaceutical.

6. The system of claim 1, wherein the control device is configured to:
determine whether an object in an image contains a number of pixels which is within a predetermined number of pixels to detect the spilled pharmaceutical.

7. The system of claim 1, wherein the control device is configured to:
determine whether an object appears in at least three consecutive images to detect the spilled pharmaceutical.

8. The system of claim 1, wherein the control device is configured to:
determine whether an object appears in at least three of four consecutive images to detect the spilled pharmaceutical.

9. The system of claim 1, wherein the control device is configured to:
sense movement of a pharmaceutical container being moved into a filling area;
trigger the light panel; and
compare images received from the camera to detect the spilled pharmaceutical.

10. The system of claim 9 further comprising an automated dispensing device operatively connected to the control device and configured to dispense pharmaceuticals into prescription containers on carriers in a filling location above the field of view.

11. A spilled pharmaceutical detection method for use in filling prescriptions in an automated filling center, the method using a camera positioned opposite a mirror across a field of view comprising:
illuminating a field of view with a light panel to direct light at a mirror;
acquiring at least three consecutive images of a reflected field of view from the mirror via a camera; and
determining whether an object in at least a portion of the at least woe three consecutive images is a spilled pharmaceutical using a predetermined number of images from the camera showing the spilled pharmaceutical and wherein determining whether the object is a spilled pharmaceutical includes comparing the captured images in an image comparison module, and determining whether the object appears in at least two non-sequential images of the captured images.

12. The method of claim 11 wherein the step of determining whether an object in the at least two images is a spilled pharmaceutical includes:
determining whether an object in an image has moved a distance which is within a predetermined distance from an object in a consecutive image.

13. The method of claim 11 wherein the step of determining whether an object in the at least two images is a spilled pharmaceutical includes:
determining whether an object in an image contains a number of pixels which is within a predetermined number of pixels.

14. The method of claim 11 wherein the step of determining whether an object in the at least two images is a spilled pharmaceutical includes:
determining whether an object appears in at least three consecutive images.

15. The method of claim 11 wherein the step of determining whether an object in the at least two images is a spilled pharmaceutical includes:
determining whether an object appears in at least three of four consecutive images.

16. The method of claim 11, wherein determining whether an object is a spilled pharmaceutical includes performing a blob detection and analysis, wherein a blob is an area of connected pixels of similar intensity or color.

17. The method of claim 11 wherein determining includes:
sensing movement of a pharmaceutical container being moved into a filling area;
triggering a light panel to illuminate the field of view below the filling area; and
comparing images received from the camera.

18. The method of claim 17 further comprising dispensing a pharmaceutical using an automated dispensing device to a prescription container on a carrier in the filling location above the field of view.

19. A pharmaceutical filling system comprising:
a control device;
a concave mirror;
a camera positioned opposite the concave mirror across a field of view and including:
  a camera facing the mirror for capturing images and connected to the control device, wherein the camera is focused on a reflection in the mirror of the field of view, and
  a light panel electrically connected to the control device and facing the mirror to illuminate the field of view;
wherein the control device is operable to:
  receive a series of at least five consecutive images captured by the camera; and
  determine whether an object appears in at least two non-sequential pairs of consecutive images to detect a spilled pharmaceutical.

20. The system of claim 19, wherein the control device is configured to:
sense movement of a pharmaceutical container being moved into a filling area;
trigger the light panel; and
compare images received from the camera to determine whether an object in an image has moved a distance within a predetermined distance from an object in a consecutive image and thereby detect the spilled pharmaceutical.

* * * * *